United States Patent Office 3,435,037
Patented Mar. 25, 1969

3,435,037
ORGANOTIN DERIVATIVES OF GLUTARIMIDE-β-ACETIC ACID
Horst G. Langer, Cochituate, and Nicolas A. Starkovsky, Weston, Mass., assignors to The Dow Company, Midland, Mich., a corporation of Delaware
No Drawing. Filed Dec. 24, 1964, Ser. No. 421,109
Int. Cl. C07f 7/22; C07d 29/24; A01n 9/00
U.S. Cl. 260—270
16 Claims

ABSTRACT OF THE DISCLOSURE

Novel metal derivatives of glutarimide-β-acetic acid wherein the metal is a metal atom from Group IV-A or V-A. The novel compounds are prepared by reacting a reactive organometal compound containing at least one inorganic substituent, or a reactive inorganic metal compound, e.g., the metal chloride, with glutarimide-β-acetic acid, esters of said acid, and N-alkylglutarimide-β-acetic acid.

---

This invention relates to a new class of organometal compounds and to a method of their preparation, the compounds being characterized as the reaction products of organometal compounds with glutarimide-β-acetic acid.

It is a fundamental object of this invention to provide novel organometal derivatives of glutarimide-β-acetic acid.

It is another object of the invention to provide novel organosilicon, organogermanium, organotin, organolead, organomagnesium, organobismuth and organoantimony.

It is still another object of the invention to provide processes for preparing said novel organometal compounds.

Other objects and advantages of the invention will in part be obvious and in part appear hereinafter.

This invention accordingly is embodied in novel organo-metal derivatives of glutarimide-β-acetic acid. These novel compounds are prepared by reacting glutarimide-β-acetic acid, an ester of glutarimide-β-acetic acid, or a N-substituted derivative of glutarimide-β-acetic acid, with an organometal compound of a Group IV-A or V-A metal. The preparation of certain of the reactant derivatives of said acid is disclosed in an application of N.A. Starkovsky, Ser. No. 421,115, filed Dec. 24, 1964, which is hereby incorporated herein in its entirety. The organo-metal compound used as the reactant will have from one to three organic groups bonded to tetravalent metal atoms, and one or two organic groups bonded to trivalent metal atoms; the remaining valences of the metal atom being satisfied by oxygen, hydroxide, halide (generally chloride), alcoholate or phenolate, carboxylic acid residues, e.g. acetates, etc. During the course of the reaction the organometal compound reacts by splitting the bonds from the metallic atom to atoms other than carbon atoms, and reacts at these now unsatisfied valence sites, with the glutarimide-β-acetic acid. Reaction with glutarimide-β-acetic acid or an N-substituted derivative of glutarimide-β-acetic acid is completely or primarily by replacement of the acid hydrogen of the glutarimide-β-acetic acid. When the reaction is with an ester of glutarimide-β-acetic acid, the organometal moiety bonds to the nitrogen atom. Consequently the invention may be broadly divided into two sub-generic groups, dependent upon whether the organometal moiety is bonded to the nitrogen atom, or to the acid end of the glutarimide-β-acetic acid moiety. However, it will become apparent from the more detailed disclosure hereinafter, that this clear-cut distinction cannot always be made.

Those novel compounds in which the organometal moiety is bonded primarily or completely to the acid end of the glutarimide-β-acetic acid moiety may be shown in conventional fashion by the following representation (I):

I
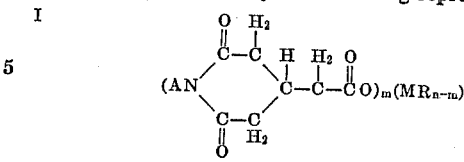

wherein A is hydrogen or a hydrocarbon group such as a lower alkyl; M represents an n-valent metal (tri- or tetravalent); $m$ is at least 1 and is equal or smaller than $n-1$, when $n$ is 4, $m$ is 1, 2 or 3, when $n$ is 3, $m$ is 1 or 2; when $n-m$ is greater than 1, all the R groups need not be the same; and R is an organic group. It is believed that when A is not hydrogen, the compounds are the salts of the glutarimide-β-acetic acid. When A is hydrogen, the compounds are considered to be largely in the form of the organometal salt of the glutarimide-β-acetic acid, based on infra-red evidence of metal to acetate bonds. However, there is also some evidence of more complicated intermolecular arrangements with unsymmetrical hydrogen bonding as indicated by split $>C=O$ and $>NH$ bands.

When utilizing the glutarimide-β-acetic acid ester as the reactant, the novel derivatives may be shown in conventional fashion by the following representation (II):

II
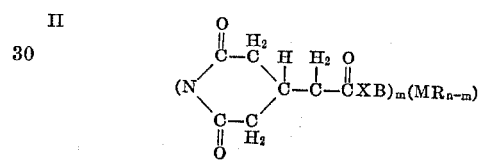

wherein X is oxygen or sulfur and B represents an esterifying group.

The glutarimide-β-acetic acid reactants are also known as 2,6-dioxo-4-piperidine-β-acetic acid. These compounds may carry one or more common substituents such as the alkyls, alkoxys, halides, etc. in place of one or more of the hydrogen atoms bonded to the carbon atoms. As is apparent from the Formula II, when X is sulfur, the reactant esters are not, strictly speaking, esters of glutarimide-β-acetic acid, but are the corresponding esters of the thio acid, i.e., the esters of glutarimide-β-ethanethiolic acid. The esterifying group "B" is preferably an alkyl group having up to about 18 carbon atoms, or a monocyclicaryl group. These groups may also carry one or more common substituents such as the alkyls, alkoxys, halides, amines, etc. All such substituted glutarimide-β-acetic acid compounds, including the corresponding thio esters are considered to be the equivalent of the glutarimide-β-acetic acids illustrated herein and are meant to be encompassed within the scope of the terms specified in the claims.

The organometal derivatives contemplated are those of the Group IV and V-A metals of the periodic classification of elements, namely silicon, germanium, tin, lead, arsenic, antimony, and bismuth, etc. The preferred organic groups bonded to the metal atom of the reactant organo-metal and consequent reaction product are the lower alkyls and lower alkenyls such as ethyl, butyl, octyl, vinyl, allyl; the monocyclic alkyls such as cyclopentyl and cyclohexyl; and the mono- and dicyclic aryls such as phenyl, tolyl, naphthyl, etc. These organic groups may carry certain common substituents such as halogens, hydroxyl or ether groups, etc. Such substituted groups are meant to be encompassed within the scope of the terms specified in the claims.

The organometal portions of these compounds are best exemplified by organotin salts, which are readily available commercially as hydroxides, halides acetates or bis-organotin oxides.

Reference to the following specific examples will give an accurate indication of the process steps involved in the formation of these novel derivatives of glutarimide-β-acetic acid, as well as an indication of the nature of these materials.

The following preparatory process was used to produce the product of Example 1. Similar procedures were used to prepare the products of Examples 2–12.

EXAMPLE 1

50 millimoles of dimethyltin oxide and 100 millimoles of glutarimide-β-acetic acid are refluxed for 17 hours in 100 milliliters of benzene. The water eliminated during the reaction is removed from the reaction solution. The dimethyltin glutarimide acetate remains as a solid suspended in benzene and is isolated by filtration.

| Ex.[1] | (MR$_{n-m}$) | Formula | Mol. weight | Melting point, °C. | Yield, percent |
|---|---|---|---|---|---|
| 1 | Dimethyltin | $C_{16}H_{22}N_2O_8Sn$ | 489 | 165 | 96 |
| 2 | Trimethyltin | $C_{10}H_{17}NO_4Sn$ | 334 | 176–184 |  |
| 3 | Triethyltin | $C_{13}H_{23}NO_4Sn$ | 376 | 156 | 83 |
| 4 | Tri-i-propyltin | $C_{16}H_{29}NO_4Sn$ | 418 | 70 | 66 |
| 5 | Tributyltin | $C_{19}H_{35}NO_4Sn$ | 460 | 91–92 | 65.4 |
| 6 | Tricyclohexyltin | $C_{25}H_{41}NO_4Sn$ | 538 | 190–195 | 72.5 |
| 7 | Trivinyltin | $C_{13}H_{17}NO_4Sn$ | 370 | [2] 180 | 80 |
| 8 | Triallyltin | $C_{16}H_{23}NO_4Sn$ | 412 | [2] 17–185 | 71 |
| 9 | Diphenyltin | $C_{25}H_{23}NO_4Sn$ | 520 | 165 | 63.4 |
| 10 | Diethyltin | $C_{18}H_{22}N_2O_8Sn$ | 517 | 222–225 | 77 |
| 11 | Divinyltin | $C_{18}H_{26}N_2O_8Sn$ | 513 | [2] 165 | 64 |
| 12 | Diphenylantimony | $C_{19}H_{18}NO_4Sb$ | 446 | 181–189 | 66 |

[1] The compounds of the examples are the designated organometal derivatives of glutarimide-β-acetic acid.
[2] Decompose.

Referring back to the general formula and the specific formulas for the organometal salts used as the reactants, it is, of course, evident that the raw materials necessary for the formulation are the glutarimide-β-acetic acid, and the organometal compound. Although the organometal chlorides, oxides and hydroxides are preferred as the source of the —MR$_{n-m}$ moiety, such equivalents as the corresponding alcoholates, carboxylates, etc., may be employed in the process. The alkali metal or alkaline earth metal salts of glutarimide-β-acetic acid may be used as the reactant. Generally stoichiometric proportions of the compounds are used. The reaction temperature is preferably at or near the boiling point of the solvent. The solvents may include water, ethanol, etc. Atmospheric pressures are generally suitable. When the glutarimide-β-acetic acid or a derivative thereof is reacted with the organometal reactant, hydrogen chloride, sodium chloride, or water is eliminated and preferably removed during the course of the reaction.

EXAMPLE 13

1 mole of 2,6-dioxo-4 piperidine acetic acid ethyl ester is dissolved in toluene and heated (reflux) with 1 mole of sodium metal until all sodium is dissolved and the N-sodium salt is precipitated. To this slurry is added one mole of triethyltin chloride and the mixture is heated for several hours. After evaporation of the solvent, 1-triethyltin-2,6-dioxo-4 piperidine acetic acid, ethylester is obtained as a liquid mixed with some reactant material and triethyltinoxide. The final product is very sensitive to moisture.

EXAMPLE 14

2,6-dioxo-4-piperidine acetic acid and tri-n-butyltin salt is dissolved in bis(tri-n-butyltin) oxide and kept at approximately 120° C. until the boiling has stopped and crystals of 1 - tri-n-butyltin-2,6-dioxo-4-piperidine-tri-n-butyltin acetate appears. The product is a colorless solid and insoluble in the common organic solvents. It decomposes in water and moist air.

Although organotins have been most used as the organometal compound in generally illustrating the reactions, the other metals of Groups IV–A and V–A of the periodic classification of the elements may also be used, namely silicon, germanium, tin, lead, arsenic, antimony and bismuth, to form the corresponding organometal derivatives of the glutarimide-β-acetic acid. Typical reactants include: dimethylantimony chloride, ethylantimony dichloride, phenyl- and diphenylantimony chloride, bis methylantimony oxide, bis(dibutylantimony) oxide, bis (-diphenylantimony) oxide, diphenylbismuth chloride, diphenyl-arsenic bromide, phenyldichloro arsene, methylarsenic difluoride, and phenylarsenic oxide. The Group IV metal reactants are generally those corresponding to the organotin reactants disclosed herein. Typical compounds which can be made using these metals, in accordance with this invention, are the following:

(a) 2,6-dioxo-4-piperidine diphenyllead acetate
(b) 2,6-dioxo-4-piperidine triethyllead acetate
(c) 2,6-dioxo-4-piperidine diphenylbismuth acetate
(d) 2,6-dioxo-4-piperidine naphthylbismuth acetate
(e) 2,6-dioxo-4-piperidine dibutylarsenic acetate
(f) 2,6-dioxo-4-piperidine phenylarsenic acetate
(g) 2,6-dioxo-4-piperidine butylantimony acetate
(h) 2,6-dioxo-4-piperidine dibutylantimony acetate
(i) 2,6-dioxo-4-piperidine dibutylsilicon acetate
(j) 2,6-dioxo-4-piperidine diethylgermanium acetate
(k) 2,6-dioxo-4-piperidine dimethyltin acetate
(l) 2,6-dioxo-4-piperidine trimethyltin acetate
(m) 2,6-dioxo-4-piperidine triethyltin acetate
(n) 2,6-dioxo-4-piperidine tri-i-propyltin acetate
(o) 2,6-dioxo-4-piperidine tributyltin acetate
(p) 2,6-dioxo-4-piperidine tricyclohexyltin acetate
(q) 2,6-dioxo-4-piperidine trivinyltin acetate
(r) 2,6-dioxo-4-piperidine triallyltin acetate
(s) 2,6-dioxo-4-piperidine diphenyltin acetate
(t) 2,6-dioxo-4-piperidine diethyltin acetate
(u) 2,6-dioxo-4-piperidine divinyltin acetate
(v) 2,6-dioxo-4-piperidine diphenylantimony acetate.

The compounds formed in accordance with this invention are generally solids. The diorganotin compounds are practically insoluble in water and common organic solvents. Although the Formulae I and II represent the compounds as monomers, some of them may be polymeric in nature. Non-monomeric material forms where the organometallic reactant contains more than one noncarbon bonded substituent, e.g. diethyllead dichloride. These organometal derivatives of glutarimide-β-acetic acid generally may be reduced to fine degrees of subdivision and have considerable value as fungicides, and slimicides. Testing indicates 100% effectiveness of certain of these compounds against Southern Army worm, in a range of between 6.2 parts and 5000 parts per million (p.p.m.); against two spotted spider mite in about the same range; against the house fly in a range between 100 p.p.m. and 500 p.p.m. against the confused flower beetle at about 500 p.p.m.; and against a wide variety of other materials including pinworms, ascarids, and tapeworms at very low concentrations, e.g. .06%. The compounds generally have unique and diversified solubilities in different solvents, as compared with other derivatives of the two described moieties. These compounds are generally fairly stable. Because of these unique combination of properties these materials may be used as paint additives, antifouling agents, wood preservatives, catalysts, etc.

What is claimed is:
1. The compound having the formula given by the following:

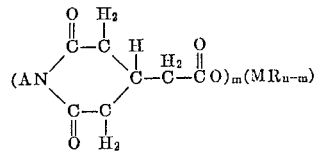

wherein

A is selected from the group consisting of hydrogen, and unsubstituted lower alkyl moieties;
M is tin;
R is selected from the group consisting of lower alkyl, lower alkenyl, monocyclicalkyl, and monocyclicaryl and dicyclicaryl moieties;
n is 4; and
m is an integer from 1 to 3.

2. The compounds having the formula given by the following:

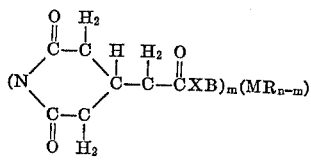

wherein

X is selected from the group consisting of oxygen and sulfur;
B is selected from the group consisting of alkyls having up to 18 carbon atoms, and monocyclicaryl moieties;
M is tin;
R is selected from the group consisting of lower alkyl, lower alkenyl, monocyclicalkyl and monocyclic aryl and dicyclicaryl moieties;
n is 4; and
m is an integer from 1 to 3.

3. 2,6-dioxo-4-piperidine dimethyltin acetate.
4. 2,6-dioxo-4-piperidine trimethyltin acetate.
5. 2,6-dioxo-4-piperidine triethyltin acetate.
6. 2,6-dioxo-4-piperidine tri-i-propyltin acetate.
7. 2,6-dioxo-4-piperidine tributyltin acetate.
8. 2,6-dioxo-4-piperidine tricyclohexyltin acetate.
9. 2,6-dioxo-4-piperidine trivinyltin acetate.
10. 2,6-dioxo-4-piperidine triallyltin acetate.
11. 2,6-dioxo-4-piperidine diphenyltin acetate.
12. 2,6-dioxo-4-piperidine diethyltin acetate.
13. 2,6-dioxo-4-piperidine divinyltin acetate.
14. 1-triethyltin-2,6-dioxo 4-piperidine acetic acid.
15. 1-tri-n-butyltin-2,6-dioxo-4-piperidine tri-n-butyltin acetate.

16. The method of preparing derivatives of glutarimide-β-acetic acid which comprises reacting up to 2 moles of a compound having the formula $R_{n-m}SnQ_m$ wherein R is selected from the group consisting of lower alkyl, lower alkenyl, monocyclicalkyl, monocyclicaryl, diclicaryl,
M is tin;
Q is selected from the group consisting of oxygen, halides and hydroxides,
n is 4;
m is an integer from 1 to 3;

per mole of a compound selected from the group consisting of glutarimide-β-acetic acid and N-alkylglutarimide-β-acetic acid wherein said alkyl is a lower alkyl.

References Cited

UNITED STATES PATENTS

| 2,867,566 | 1/1959 | Weinberg | 167—53.1 |
| 3,039,920 | 6/1962 | Okuda | 260—270 X |
| 3,223,711 | 12/1965 | Shibe et al. | 260—270 X |
| 3,337,551 | 8/1967 | Faith | 260—281 X |

ALEX MAZEL, *Primary Examiner.*

D. G. DAUS, *Assistant Examiner.*

U.S. Cl. X.R.

21—7; 106—288; 252—431; 260—78, 999, 281, 289, 306.7, 271, 309.6, 310, 429.7, 446, 447, 440, 429, 436